United States Patent
Beyer et al.

(10) Patent No.: US 12,480,872 B2
(45) Date of Patent: Nov. 25, 2025

(54) METHOD FOR MEASURING A CONCENTRATION OF A GAS AND ASSOCIATED APPARATUS

(71) Applicant: SICK AG, Waldkirch (DE)

(72) Inventors: Thomas Beyer, Freiburg (DE); Julian Edler, Emmendingen (DE)

(73) Assignee: SICK AG, Waldkirch (DE)

( * ) Notice: Subject to any disclaimer, the term of this patent is extended or adjusted under 35 U.S.C. 154(b) by 133 days.

(21) Appl. No.: 18/370,034

(22) Filed: Sep. 19, 2023

(65) Prior Publication Data

US 2024/0094122 A1    Mar. 21, 2024

(30) Foreign Application Priority Data

Sep. 20, 2022   (EP) .................................... 22196656

(51) Int. Cl.
  *G01N 21/39*   (2006.01)
  *G01J 3/433*   (2006.01)

(52) U.S. Cl.
  CPC ............ *G01N 21/39* (2013.01); *G01J 3/4338* (2013.01); *G01N 2201/121* (2013.01); *G01N 2201/1273* (2013.01)

(58) Field of Classification Search
  CPC ............ G01N 21/39; G01N 2201/121; G01N 2201/1273; G01N 21/3504; G01N 2021/3595; G01J 3/4338; G01J 3/433
  (Continued)

(56) References Cited

U.S. PATENT DOCUMENTS 7,230,712 B2   6/2007   Cannon

FOREIGN PATENT DOCUMENTS

EP    3112846 A1    1/2017

OTHER PUBLICATIONS

Yang Chenguang et al: "Wavelength modulation spectroscopy by employing the first harmonic phase angle method", Optics Express, Bd. 27, Nr. 9, Apr. 17, 2019 (Apr. 17, 2019), p. 12137, XP093022259,DOI: 10.1364/OE.27.012137 URL: https://opg.optica.org/directpdfaccess/fcbc5094-f281-4f7c-a2f32f2e54f5b934_409060/oe-27-9-12137.pdf?da=1&id=409060&seq=0&mobile=no.

(Continued)

*Primary Examiner* — Md M Rahman
(74) *Attorney, Agent, or Firm* — Nath, Goldberg & Meyer; Jerald L. Meyer (57) ABSTRACT

The invention relates to a method for measuring a concentration of a gas in a gas mixture, said method comprising that: a light beam modulated in a ramp shape and/or in a step shape in its wavelength and additionally periodically modulated, in particular in its wavelength, is transmitted from a light source, in particular a laser, into a measurement zone; the modulated light beam passes through a gas mixture in the measurement zone and is detected as reception light by a detector, wherein the reception light is converted by the detector into a detector signal; a derivative signal is determined based on the detector signal by performing a transformation of the detector signal into the frequency range, in particular by a Fourier transform of the detector signal, wherein an evaluation of the detector signal transformed into the frequency range is performed, in particular only, for an n-fold of the frequency of the modulated light beam in order to obtain the derivative signal; and at least two measurement values of a phase of the derivative signal are determined and a correction function is calculated based on the determined measurement values of the phase of the derivative signal in order to correct the derivative signal with the correction function.

18 Claims, 5 Drawing Sheets

(58) Field of Classification Search
USPC .......................................................... 356/437
See application file for complete search history.

(56) References Cited

OTHER PUBLICATIONS

Peng Wen Yu et al: "Analysis of laser absorption gas sensors employing scanned-wavelength modulation spectroscopy with 1-phase detection", Applied Physics B, Springer Berlin Heidelberg, Berlin/Heidelberg, Bd. 126, Nr. 1, Dec. 21, 2019 (Dec. 21, 2019), XP036991197, ISSN: 0946-2171, DOI: 10.1007/S00340-019-7369-7 [found on Dec. 21, 2019].
Search Report dated Feb. 20, 2023 issued in corresponding European Application No. 22196656.7.

METHOD FOR MEASURING A CONCENTRATION OF A GAS AND ASSOCIATED APPARATUS

The present invention relates to a method and an apparatus, in particular a laser spectrometer, for detecting a concentration of a gas.

In TDLS (Tunable Diode Laser Spectroscopy), the wavelength of a laser is varied so that absorption lines of a gas or a gas mixture are scanned or detected. For this purpose, the transmitted light of the laser is modulated in its wavelength and is detected by a detector after a passing through of the gas to be measured. The amount of light absorbed by a gas mixture in a specific wavelength range can be taken from a detector signal, i.e. the signal that is generated by the detector based on the amount of light incident on the detector. Each gas in this respect absorbs light of one or more specific wavelengths or of a specific wavelength range, i.e. each gas or gas mixture has a different absorption line, wherein a gas can also have a plurality of absorption lines. The concentration of individual gases in a gas mixture can e.g. be determined from the detector signal and the absorption lines.

Current methods for measuring the gas concentration attempt to determine a concentration of a gas in a gas mixture based on a detector signal analysis. However, these methods are often computationally complex and have an increased susceptibility to error.

It is an underlying object of the invention to provide an improved method and an improved apparatus, in particular a laser spectrometer, for measuring the concentration of gases of a gas mixture.

This object is satisfied by a method in accordance with claim 1 and an apparatus in accordance with claim 8.

The invention relates to a method for measuring a concentration of a gas in a gas mixture, said method comprising that:
- a light beam modulated in a ramp shape and/or in a step shape in its wavelength and additionally periodically modulated, in particular in its wavelength, is transmitted from a light source, in particular a laser, into a measurement zone;
- the modulated light beam passes through a light-absorbing medium in the measurement zone and is detected as reception light by a detector, wherein the reception light is converted by the detector into a detector signal;
- a derivative signal is determined based on the detector signal by performing a transformation of the detector signal into the frequency range, in particular by a Fourier transformation of the detector signal, wherein an evaluation of the detector signal transformed into the frequency range is performed, in particular only, for an n-fold of the frequency of the modulated light beam in order to obtain the derivative signal; and
- at least two measurement values of a phase of the derivative signal are determined and a correction function is calculated based on the determined measurement values of the phase of the derivative signal in order to correct the derivative signal with the correction function.

The light-absorbing medium can e.g. be a gas mixture. "Light-absorbing" can thus in particular mean that a portion of the wavelengths of the light beam of the light source is absorbed by the medium. However, a large portion of the wavelengths will typically pass through the medium without being absorbed. In the following, the term gas or gas mixture is used synonymously with the term light-absorbing medium. In accordance with the invention, however, any light-absorbing medium can be used, i.e. also solids, for example.

The measurement principle is therefore based on the fact that a gas or a gas mixture to be examined absorbs light of a specific wavelength or a specific wavelength range and, depending on the concentration of the gases in the gas mixture, a larger or a smaller amount of light of the wavelengths characteristic of the gases contained is absorbed. In this way, a measurement of a concentration of gases in the gas mixture can be performed.

In this respect, a light beam is modulated in a ramp shape and/or in a step shape in its wavelength and is additionally periodically modulated, in particular in its wavelength, and is transmitted into the measurement zone. The method described herein can therefore be based on WMS (wavelength modulation spectroscopy). For example, the modulation of the light beam takes place by means of a modulation of the laser current that leads to a corresponding modulation of the wavelength of the light beam. However, the modulation of the light beam can also take place in other ways. The ramp-shaped modulation of the light beam, for example, comprises a linear change of the laser current, and thus a linear change of the wavelength, wherein the linear change of the wavelength can preferably be repeated periodically. The light beam is in particular modulated in a predetermined spectral range, i.e. in a predetermined wavelength range $[\lambda_{min}, \lambda_{max}]$, preferably continuously. The predetermined spectral range is, for example, settable and can be set based on the gas in the gas mixture. Exemplary wavelength ranges are wavelength ranges from 760.3 nm to 760.5 nm, from 761.2 nm to 761.5 nm, from 763.6 nm to 763.9 nm, or from 1512 nm to 1512.6 nm.

In addition to the ramp-shaped and/or step-shaped and periodic modulation of the laser current, the laser current can comprise a constant current component. The constant current component can, for example, be an offset current. This constant current component can, for example, be 7.5 μA or 0.9 μA.

In addition, via a fast modulation of the wavelength during an e.g. increasing ramp, the wavelength is periodically modulated, e.g. by means of a sinusoidal modulation. The periodic modulation can comprise any suitable periodic form, wherein the periodic modulation in particular takes place at a modulation frequency $f_{mod}$ so that the modulated light beam has the frequency $f_{mod}$. For example, at least 50, 100, 200, 256, or 512 periods of the periodic modulation can take place per ramp. The periodic modulation can have a frequency in the range of kilohertz, e.g. 10 kHz. For the derivative signal, frequencies in the range of e.g. 20 kHz could then be evaluated.

For the ramp-shaped modulation, a current amplitude of 5 μA or 0.6 μA can, for example, be used and a sine function with a sine amplitude of 0.6 μA or 0.08 μA can, for example, be used for the fast periodic modulation.

As already indicated, the gas of the gas mixture to be examined absorbs a portion of the modulated light beam in the measurement zone so that a remaining portion of the modulated light beam is incident as reception light on a detector that converts the reception light incident on the detector into a detector signal. For example, the reception light can be converted into an electrical signal, the detector signal, by means of photodiodes. The detector signal can, for example, comprise an absorption spectrum of the gas in the gas mixture or can be used to determine the absorption spectrum of the gas in the gas mixture.

The modulated light beam can in particular be introduced into a measurement zone formed as a measurement chamber, wherein, at one end of the measurement chamber, a mirror can reflect the light of the modulated light beam to feed the light as reception light to the detector. In such an arrangement, the light can pass through a gas mixture located in the measurement chamber twice, whereby a greater absorption of characteristic wavelengths takes place.

Based on the detector signal, a wavelength range can be determined in which the gas in the gas mixture absorbs an increased amount of light. Such a characteristic wavelength in which the gas of the gas mixture absorbs an increased amount of light is also called an absorption line, wherein the gas can have a plurality of absorption lines.

To determine the absorption lines of the gas, a derivative signal is generated based on the detector signal. For this purpose, the detector signal is transformed into the frequency range, for example by means of a Fourier transformation, and is evaluated, in particular only, for the n-fold frequencies of the frequency $f_{Mod}$ of the modulated light beam. Even if the term Fourier transform is used in the following, any kind of transformation of a signal into the frequency range is meant and possible in accordance with the invention. A separate Fourier transform in particular takes place for each period of the detector signal, with a period length of the detector signal in particular corresponding to a period length of the fast modulation. For example, each period of the detector signal can be represented by a predetermined number of points, for example by a number of 32 points per period, that are used to perform a Fourier transform of the corresponding portion of the detector signal. The resulting signal after the Fourier transform can subsequently be evaluated at an n-fold frequency of the frequency $f_{Mod}$ to obtain the derivative signal, where n is an integer number and non-zero and n>1 preferably applies. This can be repeated for each period of the detector signal to obtain a set of evaluation points that together form the derivative signal. The evaluation of the Fourier transform of the detector signal preferably takes place for a twofold of the frequency $f_{Mod}$. The derivative signal in particular corresponds qualitatively to the nth derivative of the detector signal and/or of the absorption spectrum of the gas of the gas mixture.

The derivative signal, which is determined from the evaluation of the detector signal transformed into the frequency range, further in particular represents a signal in a complex space, wherein the values which are assumed by the derivative signal comprise complex numbers of the form $z=a+i\cdot b$, where a represents the real part of the complex number and b represents the imaginary part of the complex number. However, complex numbers can also be represented in the form $z=r\cdot e^{i\cdot\varphi}$, where r represents the magnitude of the complex number and $\varphi$ represents the phase of the complex number.

Since the concentration of the gas in the gas mixture results from the derivative signal and in particular based on the shape and height of the derivative signal, it is particularly advantageous to rotate the complex signal values of the derivative signal by the phase so that the imaginary part of the corresponding complex number becomes almost 0 and the real part of the complex number becomes maximum. The signal level of the derivative signal at the absorption lines, also called the absorption line strength, can then be determined after the phase rotation, in particular exclusively, from the real part of the complex number. In accordance with the invention, at least two measurement values of a phase of the derivative signal are accordingly determined at different positions in the derivative signal and a correction function is calculated based on the determined measurement values of the phase of the derivative signal, by which correction function the derivative signal and in particular the phase of the derivative signal are corrected. Since the derivative signal is very small or almost 0 in regions that do not correspond to the absorption lines, i.e. z=0, the at least two measurement values are in particular recorded in a wavelength range that corresponds to the absorption line of the gas of the gas mixture, i.e. in a wavelength range in which z≠0 applies for the derivative signal. Additionally or alternatively, the measurement values can also be recorded in one or more time ranges that can be associated with specific wavelength ranges that correspond to the absorption lines of the gas of the gas mixture.

In general, it therefore applies that the measurement values for the phase of the derivative signal are determined at the absorption lines. More than two measurement values can generally also be determined, e.g. 3, 4, 5 or 10 measurement values, wherein a plurality of measurement values can also be determined per absorption line (e.g. in the environment of the absorption lines). Measurement values can likewise e.g. be determined where z is greater than a predetermined threshold value.

Furthermore, the at least two measurement values are preferably recorded in different wavelength ranges or absorption lines. The measurement values are used to determine a correction function that approximates a course of the phase over the wavelength and/or measurement time. The measurement values can further be calculated from the derivative signal by means of a trigonometric inverse function, for example. The arccos function or the arctan function can, for example, be used for this purpose.

The method in accordance with the invention has the advantage that a measurement of the concentration of the gas in the gas mixture is facilitated and optimized by the rotation of the phase position of the derivative signal since the determination of the gas concentration from the signal level of the derivative signal can take place in a simpler manner and with less effort.

Due to the determination of a correction function based on a plurality of measurement values of the phase of the derivative signal, the fact that the phase of the derivative signal can change over the wavelength or the measurement time is taken into account. The correction function corrects the phase of the derivative signal in dependence on the wavelength or time so that measurement errors that are caused by different phase changes of the derivative signal over the spectrum (i.e. over the predetermined spectral range) are minimized.

The change in the phase of the derivative signal can e.g. be caused by the properties of the laser and the electronics. Furthermore, nonlinear effects in the heat conduction, e.g. within a laser chip of the laser, cause the phase to change along the ramp.

In accordance with the invention, the phase of the derivative signal is therefore corrected so that the imaginary part of the corrected derivative signal is almost 0 over the entire (corrected) spectrum and the real part of the corrected derivative signal is at a maximum over the entire (corrected) spectrum. Based on the maximized real part, the absorption strength or the absorption strengths of the gas in the gas mixture can be reliably determined and the concentration of the gas in the gas mixture can be calculated therefrom. Furthermore, by maximizing the real part magnitude over the entire predetermined/corrected spectrum, an increased signal-to-noise ratio is achieved.

Further embodiments of the invention can be seen from the description, from the dependent claims, and from the drawings.

In accordance with a first embodiment, the correction function is determined for a predetermined spectral range and the correction function is used to correct the phase of the derivative signal. The correction function, for example, comprises different correction values for a plurality of different wavelengths. Each signal value of the derivative signal can thus be corrected with a different correction value to obtain a corrected derivative signal.

The predetermined spectral range can be determined such that the absorption lines and in particular all the absorption lines of the gas (i.e. of a gas to be detected) lie in the predetermined spectral range.

The correction function can be a continuous or discontinuous function over the entire predetermined spectral range. In particular for discontinuous correction functions, the correction function can assume values equal to zero in some wavelength ranges, for example, in wavelength ranges that do not correspond to any absorption line.

In accordance with a further embodiment, the correction function is determined by means of a curve fitting.

In accordance with a further embodiment, the correction function comprises a linear and/or polynomial function.

For example, the correction function can be determined by means of a linear and/or polynomial regression, whereby the correction function assumes the form of a linear and/or polynomial function, in particular of at least a second or third order. The correction function can thus be determined in dependence on the actual phase position of the derivative signal. The correction function can in particular assume different correction values depending on the wavelength. Consequently, a flexible adaptation or correction of the phase position of the derivative signal becomes possible. In particular, it is possible to achieve a phase correction of the derivative signal that is as error-free as possible through the correction function, which is determined based on a course of the phase, in order to reduce measurement errors. Furthermore, by using a linear or polynomial correction function, an individual adaptation to the gas of the gas mixture to be measured is possible since different gases have a different number of absorption lines and can thus require different correction functions. Any suitable function can generally be used as a correction function, i.e. the correction function is not limited to linear and/or polynomial functions.

In accordance with a further embodiment, a determination of an error that indicates that the correction function is erroneous takes place based on a difference between the determined measurement values of the phase of the derivative signal and predefined comparison values, wherein the error is determined when the magnitude of the difference between the determined measurement values of the phase of the derivative signal and the predefined comparison values is greater than a first threshold value $\varepsilon_1$.

For example, the correction function can be erroneous if an unexpected change has occurred at the device, e.g. a change in the properties of the laser or of the electronics or a change in the thermal conductivity or a combination thereof, that results in a phase change.

In accordance with a further embodiment, a determination of an error that indicates that the correction function is erroneous takes place based on an imaginary part of a complex numerical value of the corrected derivative signal, wherein an error is determined when the magnitude of the imaginary part assumes values that are greater than a second threshold value $\varepsilon_2$.

A determination of an error that indicates that the correction function is erroneous can also take place based on the area below the imaginary part function of the corrected derivative signal, wherein the imaginary part function represents the function corresponding to the imaginary values of the corrected derivative signal, for example by the integral of the absolute area of the imaginary part function, wherein the error is determined when the magnitude of the area assumes values that are greater than a third threshold value $\varepsilon_3$.

For example, the comparison values are stored in a memory and are referred to when needed. Furthermore, different comparison values can be stored in the memory for different gases or gas mixtures. The comparison values stored in the memory can, for example, originate from an initial measurement during the manufacture of the apparatus. The number of determined measurement values preferably corresponds to the number of comparison values. Alternatively, the number of measurement values and the number of comparison values can also be different. In such a case, only measurement values and comparison values that are associated with the same wavelength range can, for example, be compared with one another. As long as at least one determined measurement value and one comparison value are associated with the same wavelength or the same wavelength range, the error determination process can thus continue to be executed successfully.

Additionally or alternatively, it is also possible that the correction function is compared with a predefined comparison function to determine an error. For example, the difference between the correction function and the predefined comparison function can be integrated over the wavelength or time and compared with a first threshold value to determine the error. If the integral of the difference between the correction function and the predefined comparison function is greater than the first threshold value, it can, for example, be determined that an error is present. Alternatively, individual points of the correction function can also be subtracted from the predefined comparison function or vice versa and the resulting difference points can be added up to determine the error. If, for example, the sum of the difference points is greater than a first threshold value, the method can determine that an error exists.

As already mentioned, an error determination can also take place based on an imaginary part and in particular on a magnitude of the imaginary part of a complex numerical value of the corrected derivative signal. Since the magnitude of the imaginary part of the corrected derivative signal is ideally almost 0 after correcting the derivative signal with the correction function, a deviation from 0 that is, for example, greater than a second threshold value $\varepsilon_2$ can indicate a corresponding error.

In accordance with a further embodiment, the determination of the phase of the derivative signal takes place at regular time intervals. For example, the determination of the phases of the derivative signal are determined continuously at a predefined frequency. Each time that the determination of the phase of the derivative signal takes place, the error determination, as described above, can additionally be performed to check whether the determination of the phase of the derivative signal takes place without error. If e.g. the phase position changes over the measurement time due to, for example, age-related errors of the measurement apparatus or due to thermal effects, this can be determined in good time.

In accordance with a further embodiment, the determination of the phase of the derivative signal is triggered by a trigger event. For example, the trigger event can be the start of a measurement of a concentration of the gas of the gas mixture or a determination of the phase manually triggered by an operator. Thus, the determination of the phase can take place based on the trigger event to check a correct operation of the process.

A further aspect of the present invention relates to an apparatus, in particular a laser spectrometer, for measuring a concentration of a gas in a gas mixture, said apparatus comprising:

a light source, in particular a laser, that is configured to transmit a light beam that is modulated in a ramp shape and/or in a step shape in its wavelength and that is additionally periodically modulated, in particular in its wavelength, into a measurement zone, wherein the apparatus comprises a detector that is configured to detect reception light from the measurement zone and to convert it into a detector signal;

a calculation module that is configured to determine a derivative signal based on the detector signal in that the calculation module performs a transformation of the detector signal into the frequency range, in particular in that the calculation module performs a Fourier transform of the detector signal, wherein the calculation module is configured to perform an evaluation of the detector signal transformed into the frequency range, in particular only, for an n-fold of the frequency of the modulated light beam in order to obtain the derivative signal; and a correction module that is configured to determine at least two measurement values of a phase of the derivative signal and to calculate a correction function based on the determined measurement values of the phase of the derivative signal in order to correct the derivative signal with the correction function.

A gas mixture that absorbs a portion of the modulated light beam is in particular present in the measurement zone, with the non-absorbed portion of the modulated light beam being incident on the detector as the reception light. The statements on the method in accordance with the invention apply accordingly.

In accordance with a further embodiment, an evaluation module is configured to determine whether the correction function or the correction is erroneous and to output a maintenance signal in the event of a positive determination. The evaluation module is in particular configured to perform the previously mentioned steps for the error determination.

In accordance with a further embodiment, the apparatus is configured to change to a safe operating state when the maintenance signal is present. Accordingly, the apparatus can be a safe apparatus, for example in accordance with SIL1, SIL2, or SIL3 ("safety integrity level").

The statements regarding the method in accordance with the invention apply accordingly to the apparatus; this in particular applies with respect to advantages and embodiments. Furthermore, it is understood that all the features and embodiments mentioned herein can be combined with one another, unless explicitly stated otherwise.

The invention will be presented purely by way of example with reference to the drawings in the following. There are shown.

Figure 1:
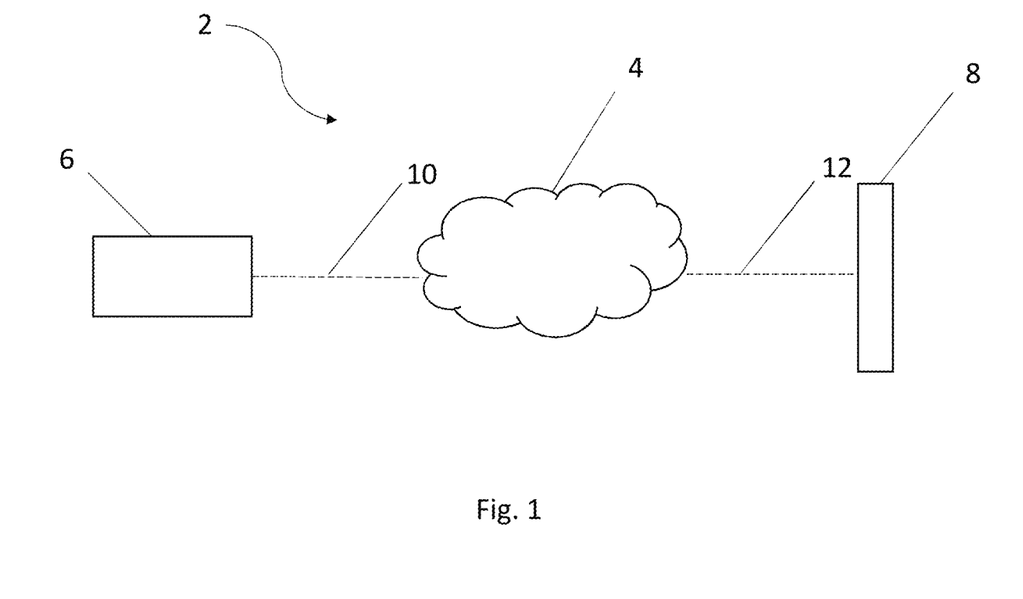
FIG. 1 an apparatus and in particular a laser spectrometer for measuring a concentration of a gas in a gas mixture.

FIG. 1 shows an apparatus 2 in the form of a laser spectrometer for measuring a concentration of a gas in a gas mixture 4, said apparatus 2 comprising a light source 6 in the form of a laser, a detector 8, a calculation module, not shown, and a correction module.

The light source 6 transmits a light beam 10 that is modulated in a ramp shape in its wavelength and that is periodically modulated in its wavelength into a measurement zone in which the gas mixture 4 is located. The gas mixture 4 or the gas in the gas mixture 4 absorbs at least a portion of the modulated light beam 10, wherein e.g. a gas in the gas mixture 4 absorbs light of one or more specific wavelength ranges.

Figure 2A:
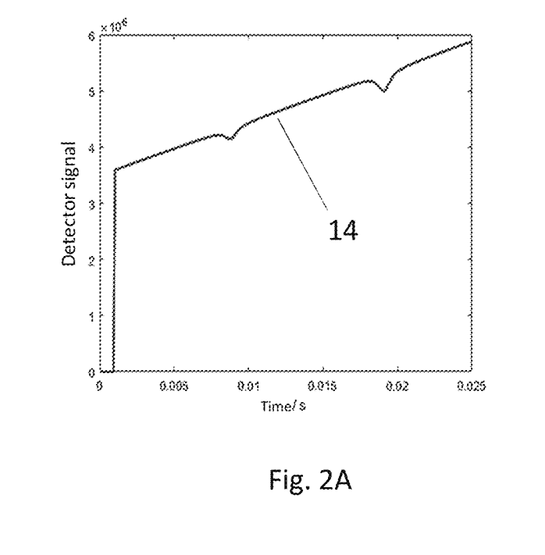
FIGS. 2A, 2B a detector signal of a light beam (2A) modulated in a ramp shape and a light beam (2B) that is modulated in a ramp shape and that is simultaneously periodically modulated.
Figure 2B:
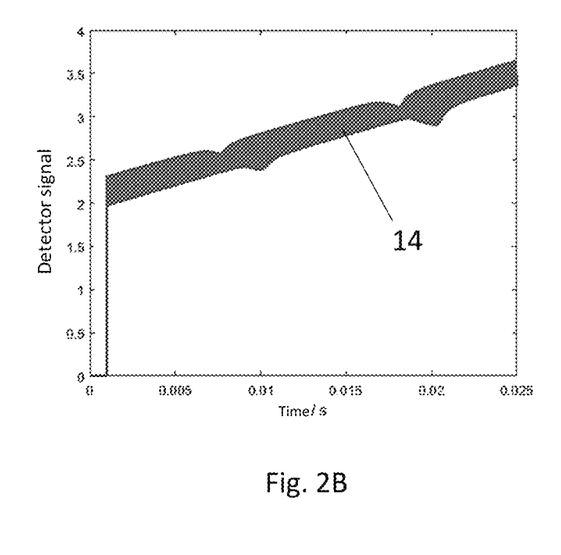

A remaining, non-absorbed portion of the modulated light beam 10, which remains after passing through the measurement zone or the gas mixture 4, is incident as reception light 12 on the detector 8 that receives the reception light 12 and converts it into a detector signal 14 (FIG. 2), in particular an electrical signal.

In FIG. 1, the light source 6 and the detector 8 are shown arranged spaced apart from one another, wherein the light beam 10 passes through the measurement zone or the gas mixture 4 between the light source 6 and the detector 8. Alternatively, a mirror can e.g. also be attached at the position of the detector 8 from FIG. 1, wherein the light source 6 and the detector 8 can both be arranged at the side of the light source 6, e.g. in a common housing.

As shown in FIG. 2, the detector signal 14 has a reduced signal intensity, which is due to the absorption of the modulated light beam 10 by the gas of the gas mixture 4, at the absorption lines, i.e. in the specific wavelength ranges for a gas in the gas mixture 4. To draw conclusions about the concentration of the gas in the gas mixture 4 based on the detector signal 14, a derivative signal is determined by means of the calculation module based on the detector signal 14. The calculation module transforms the detector signal 14 into the frequency range by means of a Fourier transform and evaluates the Fourier transform of the detector signal 14 at the frequency $n \cdot f_{Mod}$, where the frequency $f_{Mod}$ corresponds to the respective instantaneous frequency of the modulated light beam 10 and n is 2 in this example. Therefore, the Fourier transform of the detector signal 14 at the frequency $2 \cdot f_{Mod}$ is evaluated to obtain a 2f derivative signal 16 in this way.

In a next step, the 2f derivative signal 16 is further evaluated. Since the 2f derivative signal 16 represents a function in a complex space and accordingly also has a phase position between the real and imaginary part of the function values (as explained in more detail later with reference to FIGS. 3-5), the 2f derivative signal 16 is adapted by means of the correction module to improve the evaluation of the 2f derivative signal 16. For this purpose, the correction module determines at least two measurement values of a phase of the 2f derivative signal 16 and, based on the determined measurement values of the phase of the 2f derivative signal 16, calculates a correction function 18 by which the 2f derivative signal 16 is corrected or adapted. The correction function 18 is calculated by means of a curve fitting, for example an interpolation and/or extrapolation of the measurement values. For example, the correction function 18 is a linear and/or polynomial function. The 2f derivative signal 16 and in particular the phase of the 2f derivative signal 16 are corrected by means of the correction function 18 such that the magnitude of the imaginary part 20 of the corrected 2f derivative signal 16 assumes values of almost 0 over the entire predetermined spectral range and/or over the entire measurement time and a magnitude of the real part 22 of the corrected 2f derivative signal 16 assumes maximum values over the entire predetermined spectral range and/or over the entire measurement time. Based on the magnitude of the real part 22 of the 2f derivative signal 16 at the absorption lines, i.e. based on the absorption line strengths of the 2f derivative signal, the concentration of the gas of the gas mixture 4 can be determined.

FIG. 2A shows a course of the detector signal 14 over the measurement time when the modulated light beam 10 is only modulated in a ramp shape in its wavelength. In such a case, the detector signal 14 increases linearly, wherein at the absorption lines, i.e. in the ranges around 0.008 s and around 0.018 s, the signal level and thus the amount of light detected on the detector 8 are reduced due to the amount of light absorbed by the gas of the gas mixture 4. In the present case, this means that in two wavelength ranges, i.e. at two absorption lines, an increased amount of light was absorbed by the gas of the gas mixture 4 so that the detector signal 14 has two signal dips.

FIG. 2B shows a course of the detector signal 14 over the measurement time when the modulated light beam 10 is modulated in a ramp shape and periodically in its wavelength. In FIG. 2B, it can also be seen that the detector signal 14 has signal dips at the two absorption lines. It can in particular be seen that the detector signal 14 has time-delayed signal dips at the absorption lines due to the periodic modulation of the wavelength of the modulated light beam 10.

Figure 3:
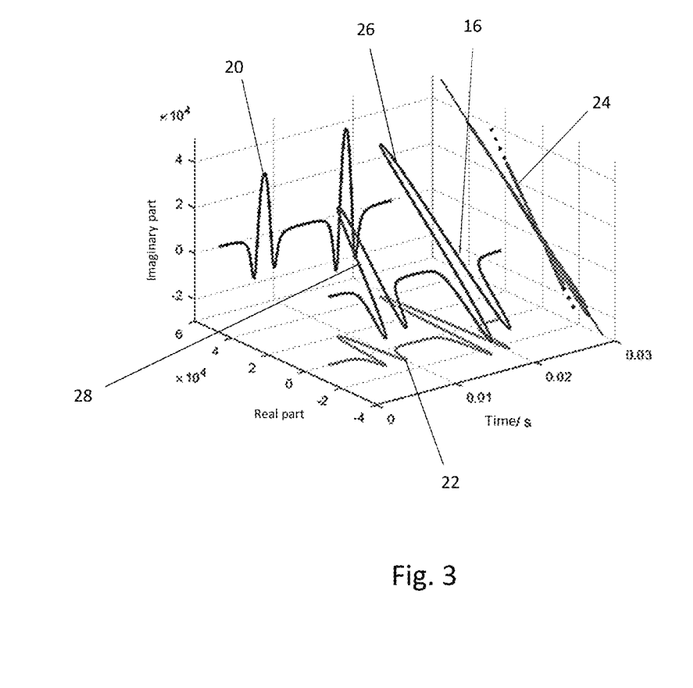
FIG. 3 a derivative signal in a complex space.

A course of the 2f derivative signal 16 is shown in a complex space in FIG. 3. Furthermore, FIG. 3 shows the course of the real part 22 and the imaginary part 20 of the 2f derivative signal 16 and a projection 24 of the 2f derivative signal 16 along the time axis. It can be seen that the 2f derivative signal 16 has two signal deflections that occur in the region of the absorption lines.

In this respect, a signal deflection can, for example, comprise a plurality of signal peaks. In FIG. 3, a signal deflection comprises three signal peaks, wherein a positive signal peak of a larger magnitude, i.e. a signal peak in the positive imaginary and real part range, lies between two negative signal peaks of a smaller magnitude, i.e. signal peaks in a negative imaginary and real part range. In this respect, a first signal deflection 26 of the two signal deflections of the 2f derivative signal 16 has a positive signal peak that is smaller than the positive signal peak of a second signal peak 28 of the two signal deflections.

In the regions in which the 2f derivative signal 16 has no signal deflections, the 2f derivative signal 16 has signal values for the imaginary part 20 and real part 22 of almost 0. Now, the magnitude of the positive signal peak is to be determined. For this purpose, it is advantageous to rotate the complex 2f derivative signal 16 about its phase position so that the magnitude of the imaginary part 20 assumes values of almost 0 and the magnitude of the real part 22 becomes maximum. However, as illustrated in FIG. 3, it can occur that the phase position of the 2f derivative signal 16 is not constant over the measurement time or wavelength. Based on the projection 24 of the 2f derivative signal 16 along the time axis, it can be seen that the first signal deflection 26 of the two signal deflections of the 2f derivative signal 16 has a different phase position from the second signal deflection 28. Therefore, the 2f derivative signal 16 is corrected with phase correction values, in particular different phase correction values, depending on the measurement time or wavelength.

Figure 4A:
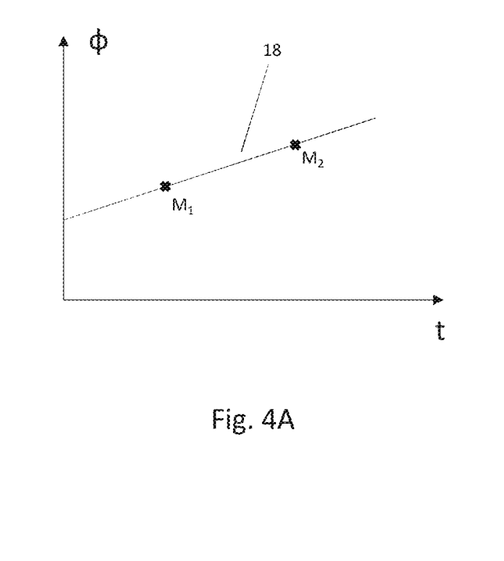
FIGS. 4A, 4B a linear (4A) and a polynomial (4B) correction function.

FIG. 4A shows a linear correction function 18 for correcting the phase of a 2f derivative signal 16. The correction function 18 is determined by using two measurement values $M_1$ and $M_2$ of the phase of the 2f derivative signal 16 that were determined at the absorption lines, i.e. in the region of the signal deflections, of the phase of the 2f derivative signal 16 to perform a linear regression with which the linear correction function 18 is determined. In FIG. 4A, the linear correction function is the connecting line of the two measurement values $M_1$ and $M_2$.

Figure 4B:
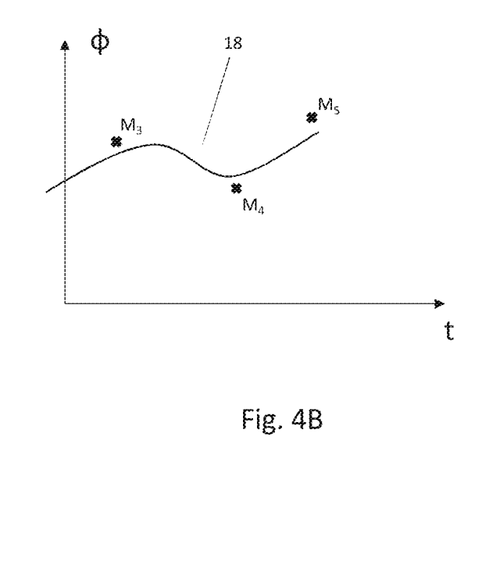

FIG. 4B shows a polynomial correction function 18 that was determined based on the determined measurement values $M_3$, $M_4$ and $M_5$ of the phase of the 2f derivative signal 16, wherein a polynomial regression was performed to determine the polynomial correction function that comprises a third order polynomial function.

Figure 5:
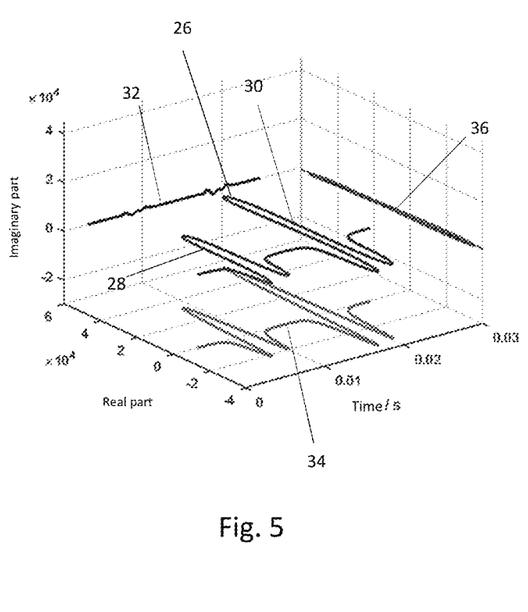
FIG. 5 a derivative signal in a complex space that is corrected with a correction function.

In FIG. 5, the corrected 2f derivative signal and the corresponding imaginary part 32 and real part 34 and the projection 36 of the corrected 2f derivative signal along the time axis are shown after the 2f derivative signal 16 from FIG. 3 has been corrected by means of a linear correction function 18. The 2f derivative signal 16 was corrected depending on the measurement time or the wavelength so that the imaginary part 32 of the corrected 2f derivative signal 30 is almost 0 for both absorption lines and the real part 34 becomes maximum for both absorption lines. The magnitude of the imaginary part 32 of the corrected 2f derivative signal 30 is in particular almost 0 over the entire measurement time. Consequently, a determination of the concentration of a gas of the gas mixture 4 is possible, in particular exclusively, based on the magnitude of the real part 34 of the corrected 2f-derivative signal 30, wherein the real part 34 of the corrected 2f-derivative signal 30 is at a maximum over the entire measurement time or over the entire predetermined spectrum so that the susceptibility to measurement errors is reduced.

REFERENCE NUMERAL LIST 2 apparatus
4 gas mixture
6 light source
8 detector
10 modulated light beam
12 reception light
14 detector signal
16 2f derivative signal
18 correction function
20 imaginary part of the 2f derivative signal
22 real part of the 2f derivative signal
24 projection of the 2f derivative signal
26 first signal deflection
28 second signal deflection
30 corrected 2f derivative signal
32 imaginary part of the corrected 2f derivative signal
34 real part of the corrected 2f derivative signal
36 projection of the corrected 2f derivative signal

The invention claimed is:

1. A method for measuring a concentration of a gas in a gas mixture, said method comprising that:
a light beam modulated in a ramp shape and/or in a step shape in its wavelength and additionally periodically modulated is transmitted from a light source into a measurement zone;

the modulated light beam passes through a light-absorbing medium in the measurement zone and is detected as reception light by a detector, wherein the reception light is converted by the detector into a detector signal;

a derivative signal is determined based on the detector signal by performing a transformation of the detector signal into the frequency range wherein an evaluation of the detector signal transformed into the frequency range is performed for an n-fold of the frequency of the modulated light beam in order to obtain the derivative signal; and at least two measurement values of a phase of the derivative signal are determined and a correction function is calculated based on the determined measurement values of the phase of the derivative signal in order to correct the derivative signal with the correction function.

2. The method in accordance with claim 1,
wherein the light beam is likewise modulated in its wavelength.

3. The method in accordance with claim 1,
wherein the light source is a laser.

4. The method in accordance with claim 1,
wherein the transformation of the detector signal into the frequency range is a Fourier transform of the detector signal.

5. The method in accordance with claim 1,
wherein the evaluation of the detector signal transformed into the frequency range is performed only for an n-fold of the frequency of the modulated light beam.

6. The method in accordance with claim 1,
wherein the correction function is determined for a predetermined spectral range and the correction function is used to correct the phase of the derivative signal.

7. The method in accordance with claim 1,
wherein the correction function is determined by means of a curve fitting.

8. The method in accordance with claim 1,
wherein the correction function comprises a linear and/or a polynomial function.

9. The method in accordance with claim 1,
wherein a determination of an error that indicates that the correction function is erroneous takes place based on a difference between the determined measurement values of the phase of the derivative signal and predefined comparison values, wherein the error is determined when the magnitude of the difference between the determined measurement values of the phase of the derivative signal and the predefined comparison values is greater than a threshold value $\varepsilon_1$.

10. The method in accordance with claim 1,
wherein a determination of an error that indicates that the correction function is erroneous takes place based on an imaginary part of a complex numerical value of the corrected derivative signal, wherein an error is determined when the magnitude of the imaginary part assumes values that are greater than a threshold value $\varepsilon_2$.

11. The method in accordance with claim 1,
wherein the determination of the phase of the derivative signal takes place at regular time intervals.

12. The method in accordance with claim 1,
wherein the determination of the phase of the derivative signal is triggered by a trigger event.

13. An apparatus for measuring a concentration of a gas of a gas mixture, said apparatus comprising:

a light source that is configured to transmit a light beam that is modulated in a ramp shape and/or in a step shape in its wavelength and that is additionally periodically modulated into a measurement zone, wherein the apparatus comprises a detector that is configured to detect reception light from the measurement zone and to convert it into a detector signal;

a calculation module that is configured to determine a derivative signal based on the detector signal in that the calculation module performs a transformation of the detector signal into the frequency range, wherein the calculation module is configured to perform an evaluation of the detector signal transformed into the frequency range for an n-fold of the frequency of the modulated light beam in order to obtain the derivative signal; and a correction module that is configured to determine at least two measurement values of a phase of the derivative signal and to calculate a correction function based on the determined measurement values of the phase of the derivative signal in order to correct the derivative signal with the correction function.

14. The apparatus in accordance with claim 13,
wherein the apparatus is a laser spectrometer.

15. The apparatus in accordance with claim 13,
wherein the light source is a laser.

16. The apparatus in accordance with claim 13,
wherein the calculation module is configured to perform a Fourier transform of the detector signal.

17. The apparatus in accordance with claim 13,
wherein an evaluation module is configured to determine whether the correction function is erroneous and to output a maintenance signal in the event of a positive determination.

18. The apparatus in accordance with claim 17,
wherein the apparatus is configured to change to a safe operating state when the maintenance signal is present.

* * * * *